(12) United States Patent
Shimura

(10) Patent No.: US 12,304,069 B2
(45) Date of Patent: May 20, 2025

(54) TEACHING SUPPORT METHOD, TEACHING SUPPORT DEVICE, AND STORAGE MEDIUM

(71) Applicant: SEIKO EPSON CORPORATION, Tokyo (JP)

(72) Inventor: Yuma Shimura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 324 days.

(21) Appl. No.: 17/853,010

(22) Filed: Jun. 29, 2022

(65) Prior Publication Data

US 2023/0001566 A1 Jan. 5, 2023

(30) Foreign Application Priority Data

Jun. 30, 2021 (JP) ................................. 2021-108751

(51) Int. Cl.
| | |
|---|---|
| *B25J 11/00* | (2006.01) |
| *B25J 9/00* | (2006.01) |
| *B25J 9/16* | (2006.01) |
| *G05B 19/42* | (2006.01) |

(52) U.S. Cl.
CPC .......... *B25J 9/0081* (2013.01); *B25J 9/1664* (2013.01); *B25J 11/0065* (2013.01)

(58) Field of Classification Search
CPC .... B25J 9/0081; B25J 9/1664; B25J 11/0065; B25J 9/161; B25J 9/1669; G05B 2219/36416; G05B 2219/36482; G05B 19/42

USPC ........................................................ 700/264
See application file for complete search history.

(56) References Cited

U.S. PATENT DOCUMENTS

| | | | |
|---|---|---|---|
| 2012/0239194 A1* | 9/2012 | Kagawa ................. | B25J 9/1692 700/254 |
| 2019/0327394 A1* | 10/2019 | Ramirez Luna ....... | H04N 23/51 |
| 2020/0215690 A1* | 7/2020 | Wang ....................... | B25J 9/163 |

FOREIGN PATENT DOCUMENTS

| | | | |
|---|---|---|---|
| JP | 2003-094363 A | | 4/2003 |
| JP | 2007203380 A | * | 8/2007 |
| JP | 2011-062793 A | | 3/2011 |
| JP | 2014208400 A | * | 11/2014 |

OTHER PUBLICATIONS

English Translation for reference JP2014208400 (Year: 2014).*
English Translation for reference JP2007203380 (Year: 2007).*

* cited by examiner

*Primary Examiner* — Rachid Bendidi
*Assistant Examiner* — Hossam M Abd El Latif
(74) *Attorney, Agent, or Firm* — Harness, Dickey & Pierce, P.L.C.

(57) ABSTRACT

A teaching support method includes: acquiring a movement of a robot arm having at least one joint, and a movement start point where the movement starts; calculating a plurality of candidates for an attitude of the robot arm at the movement start point that is acquired; calculating a state of rotation of the joint as of when the robot arm is moved according to the movement from the movement start point, for each of the plurality of candidates that are calculated; and reporting a result of calculation.

6 Claims, 6 Drawing Sheets

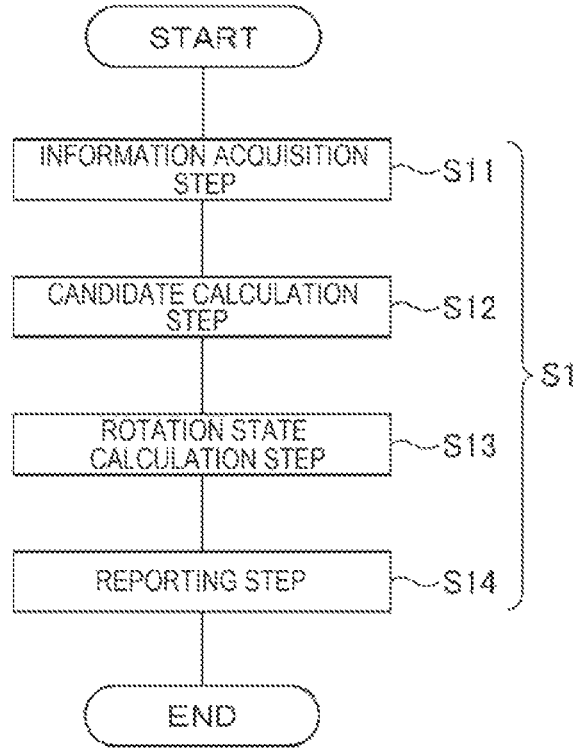

| No : | 0 | 1 | 2 | 3 | 4 | 5 | 6 | 7 |
|---|---|---|---|---|---|---|---|---|
| Wrist : | No Flip | No Flip | No Flip | No Flip | No Flip | No Flip | No Flip | No Flip |
| J1 Flag : | 0 | 0 | 0 | 0 | 1 | 1 | 1 | 1 |
| J4 Flag : | 0 | 0 | 1 | 1 | 0 | 0 | 1 | 1 |
| J6 Flag : | 0 | 1 | 0 | 1 | 0 | 1 | 0 | 1 |
| Result : | Show | Show | ✕ | ✕ | ✕ | ✕ | ✕ | ✕ |

| No : | 8 | 9 | 10 | 11 | 12 | 13 | 14 | 15 |
|---|---|---|---|---|---|---|---|---|
| Wrist : | Flip | Flip | Flip | Flip | Flip | Flip | Flip | Flip |
| J1 Flag : | 0 | 0 | 0 | 0 | 1 | 1 | 1 | 1 |
| J4 Flag : | 0 | 0 | 1 | 1 | 0 | 0 | 1 | 1 |
| J6 Flag : | 0 | 1 | 0 | 1 | 0 | 1 | 0 | 1 |
| Result : | Show | Show | Show | Show | ✕ | ✕ | ✕ | ✕ |

TEACHING SUPPORT METHOD, TEACHING SUPPORT DEVICE, AND STORAGE MEDIUM

The present application is based on, and claims priority from JP Application Serial Number 2021-108751, filed Jun. 30, 2021, the disclosure of which is hereby incorporated by reference herein in its entirety.

BACKGROUND

1. Technical Field

The present disclosure relates to a teaching support method, a teaching support device, and a teaching support program.

2. Related Art

For example, JP-A-2011-62793 describes a robot control device that corrects the angle of rotation of a robot arm at a teaching point along a movement trajectory having three or more teaching points, so that the robot arm can continuously move along the movement trajectory.

However, the control device of JP-A-2011-62793 corrects the angle of rotation, based on the attitude of the robot arm at a movement start point on the movement trajectory, and therefore may not be able to properly set the angle of rotation of the robot arm at a teaching point along the movement trajectory when the attitude of the robot arm at the movement start point is not appropriate.

SUMMARY

A teaching support method according to an aspect of the present disclosure includes: acquiring a movement of a robot arm having at least one joint, and a movement start point where the movement starts; calculating a plurality of candidates for an attitude of the robot arm at the movement start point that is acquired; calculating a state of rotation of the joint as of when the robot arm is moved according to the movement from the movement start point, for each of the plurality of candidates that are calculated; and reporting a result of calculation.

A teaching support device according to another aspect of the present disclosure acquires a movement of a robot arm having at least one joint, and a movement start point where the movement starts; calculates a plurality of candidates for an attitude of the robot arm at the movement start point that is acquired; calculates a state of rotation of the joint as of when the robot arm is moved according to the movement from the movement start point, for each of the plurality of candidates that are calculated; and reports a result of calculation.

A non-transitory computer-readable storage medium according to still another aspect of the present disclosure stores a teaching support program including: acquiring a movement of a robot arm having at least one joint, and a movement start point where the movement starts; calculating a plurality of candidates for an attitude of the robot arm at the movement start point that is acquired; calculating a state of rotation of the joint as of when the robot arm is moved according to the movement from the movement start point, for each of the plurality of candidates that are calculated; and reporting a result of calculation.

BRIEF DESCRIPTION OF THE DRAWINGS

FIG. 4 is a table showing parameters for an attitude of a robot arm.

FIG. 5 is a flowchart showing a teaching method.

DESCRIPTION OF EXEMPLARY EMBODIMENTS

A teaching support method, a teaching support device, and a teaching support program according to the present disclosure will now be described in detail, based on a preferred embodiment illustrated in the accompanying drawings.

Figure 1:
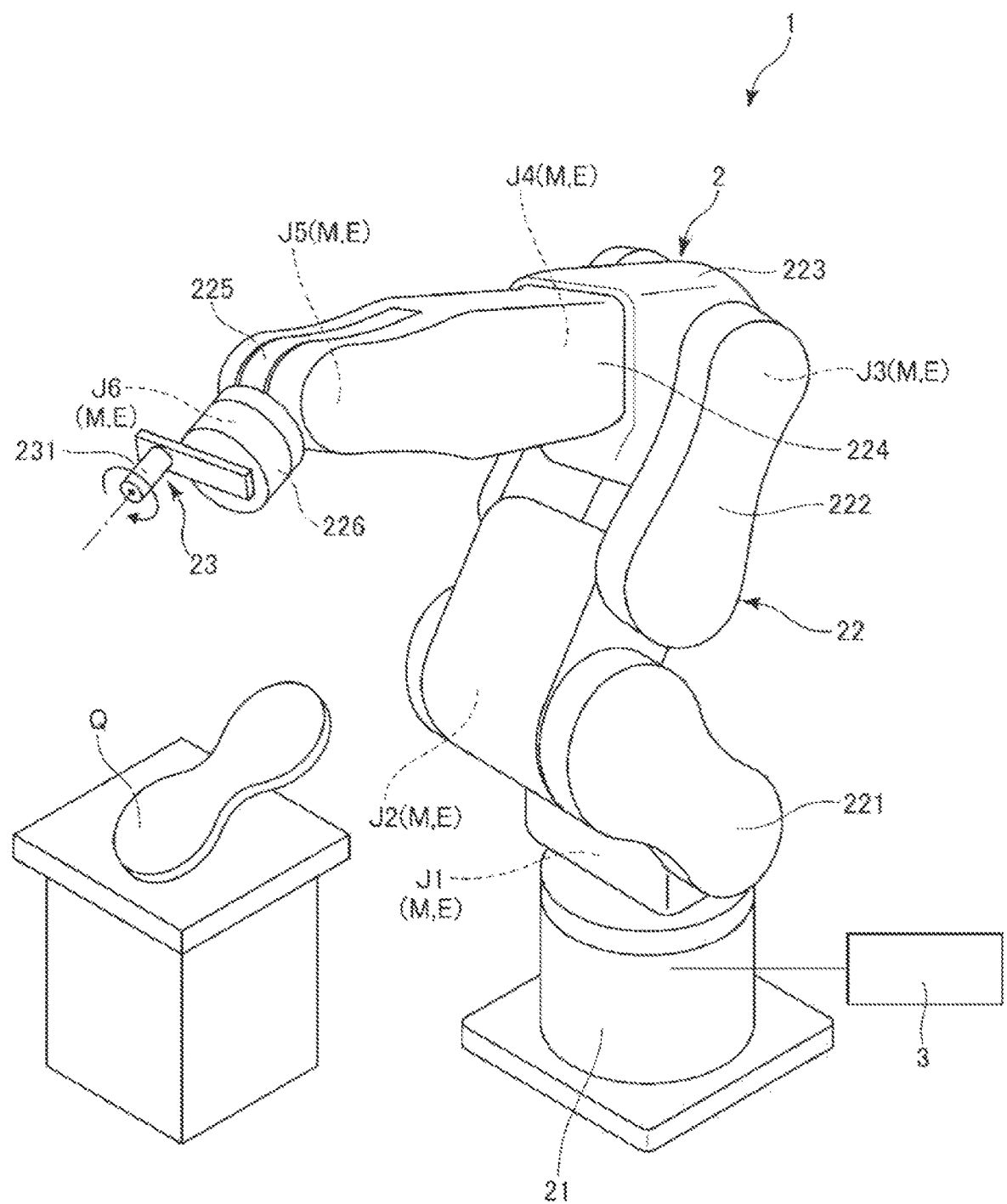
FIG. 1 is a perspective view showing an overall configuration of a robot system according to a preferred embodiment.
Figure 2:
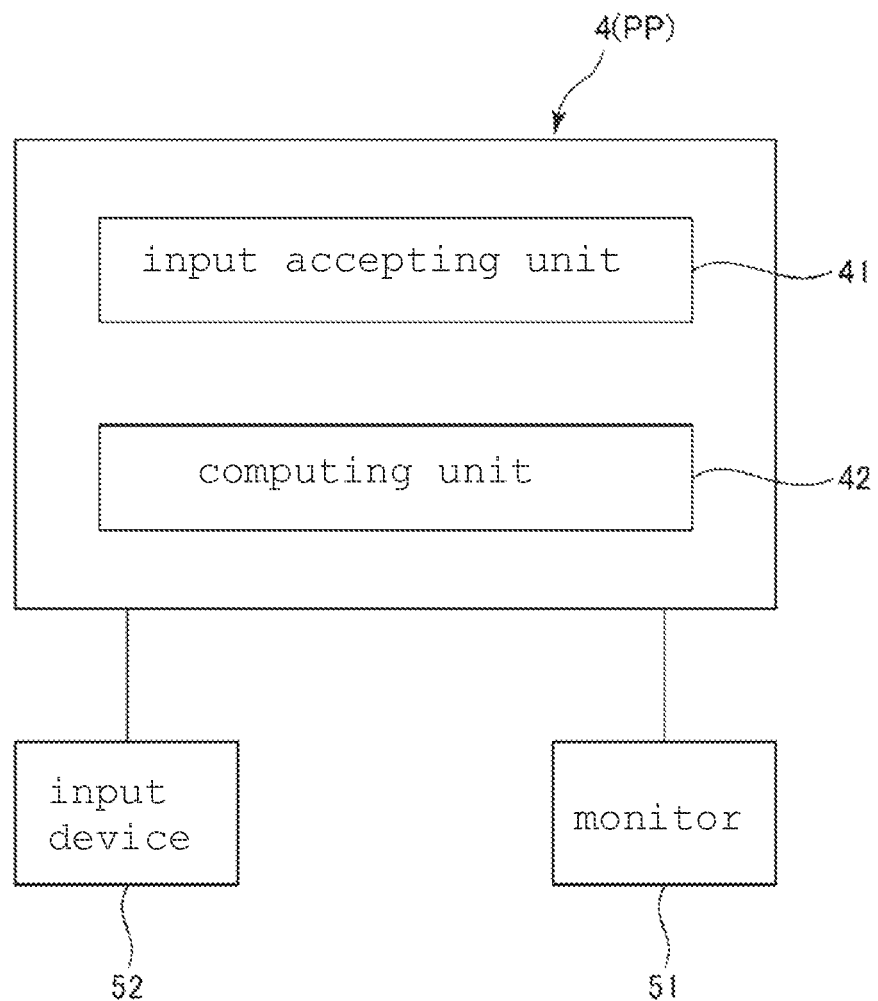
FIG. 2 is a block diagram showing a teaching support device.
Figure 3:
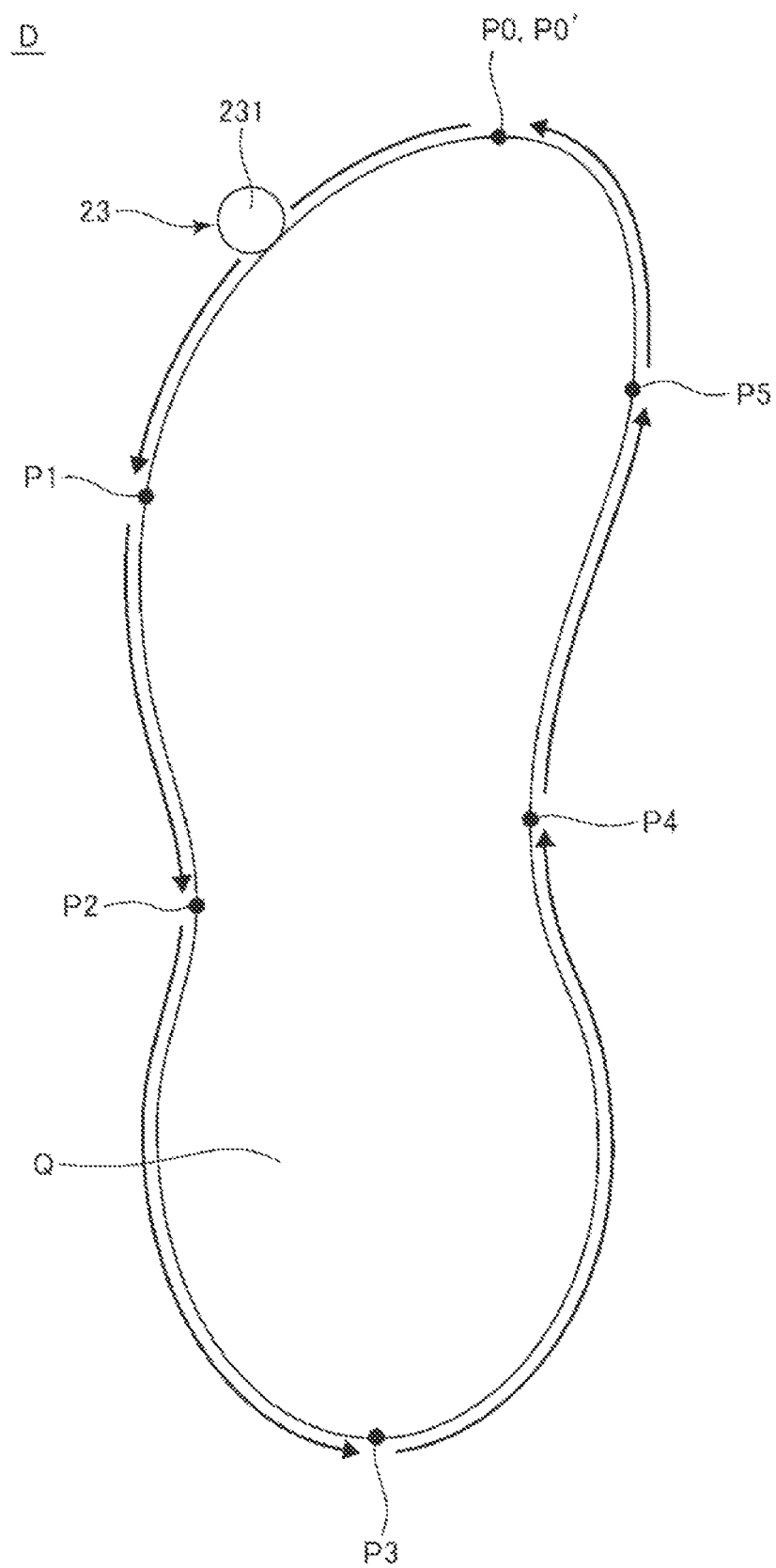
FIG. 3 shows an example of a movement.
Figure 6:
FIG. 6 is a list reported to a user.
Figure 7:
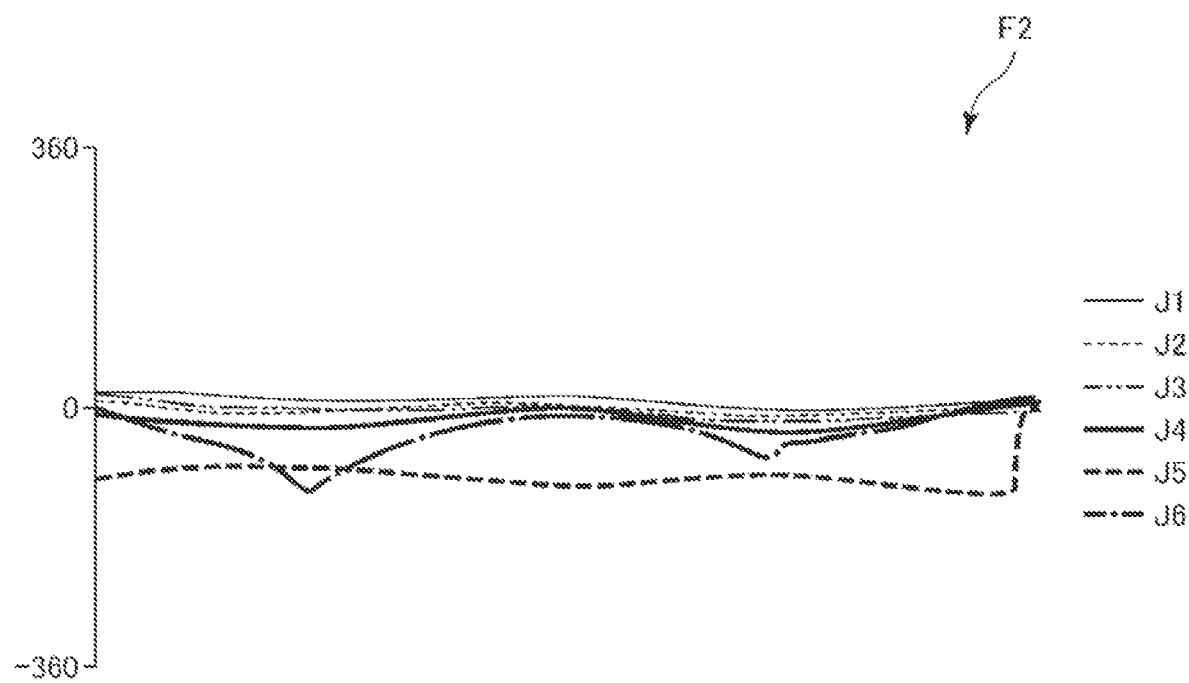
FIG. 7 is a graph reported to the user.
Figure 8:
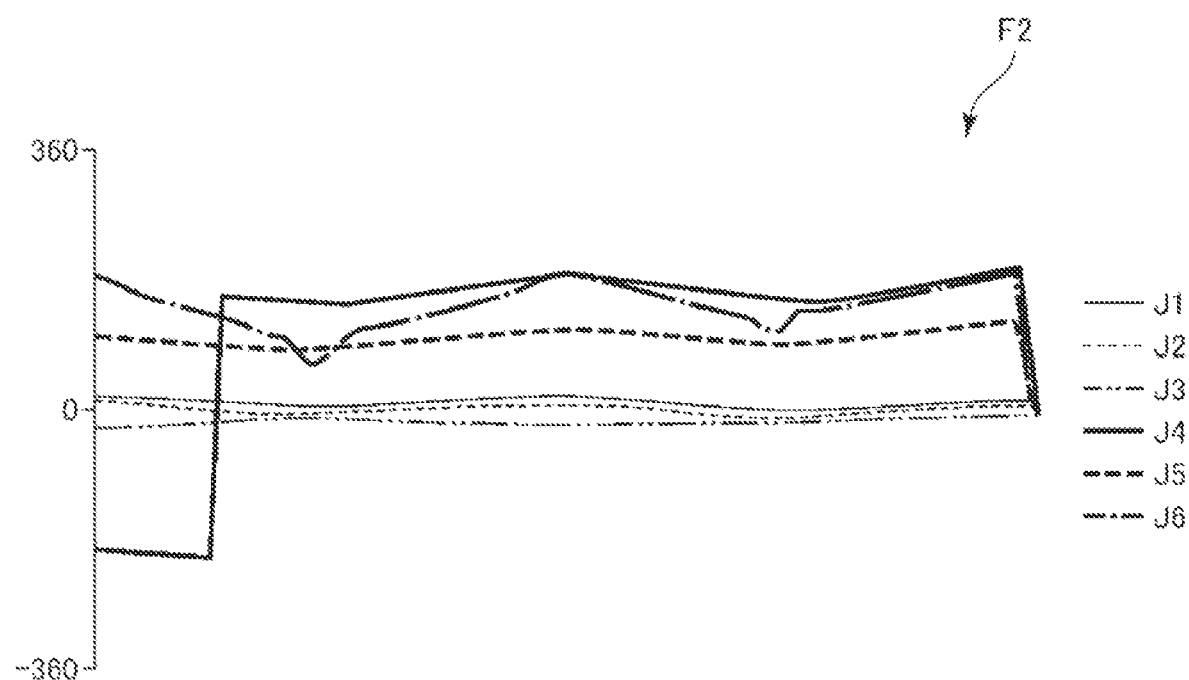
FIG. 8 is a graph reported to the user.

FIG. 1 is a perspective view showing an overall configuration of a robot system according to a preferred embodiment. FIG. 2 is a block diagram showing a teaching support device. FIG. 3 shows an example of a movement. FIG. 4 is a table showing parameters for an attitude of a robot arm. FIG. 5 is a flowchart showing a teaching method. FIG. 6 is a list reported to a user. FIGS. 7 and 8 are graphs reported to the user.

Prior to the description of a teaching support device 4, a robot system 1 supported when taught by the teaching support device 4 will be briefly described. As shown in FIG. 1, the robot system 1 has a robot 2 and a robot control device 3 controlling the driving of the robot 2.

The robot 2 is a 6-axis robot having six drive axes. The robot 2 has a base 21 and a robot arm 22 coupled to the base 21 in a rotationally movable manner. An end effector 23 is attached to a distal end part of the robot arm 22.

The robot arm 22 is a robotic arm having a plurality of arms 221, 222, 223, 224, 225, 226 coupled together in a rotationally movable manner. The robot arm 22 has six joints J1 to J6. Of these joints, the joints J2, J3, J5 are bending joints and the joints J1, J4, J6 are twisting joints. A motor M as a drive source and an encoder E detecting the amount of rotation of the motor M are installed at each of the joints J1, J2, J3, J4, J5, J6.

The end effector 23 is coupled to the arm 226. The end effector 23 is attachable to and removable from the arm 226. A suitable end effector for a task to be executed by the robot 2 can be selected and attached. The end effector 23 in this embodiment has a rotationally driven abrasive wheel 231. The robot 2 executes a polishing task to smooth the surface of a target object Q.

The robot 2 has been described above. However, the configuration of the robot 2 is not particularly limited. For example, the robot 2 may be a SCARA robot (horizontal articulated robot), a dual-arm robot, or the like. The robot 2 may be fixed to a floor or the like and thus immovable. The robot 2 may be fixed to a moving device such as an automatic guided vehicle (AGV) and thus movable.

The robot control device 3 controls the driving of the robot system 1, based on a command from a host computer (not illustrated). The robot control device 3 is formed by a computer, for example, and has a processor processing information, a memory communicatively coupled to the processor, and an external interface coupling to an external device. Various programs executable by the processor are saved in the memory. The processor can read and execute the various programs or the like stored in the memory.

The robot system 1 has been briefly described above. The teaching support device 4 supporting a teaching task for causing the robot 2 to perform a desired movement will now be described.

The teaching support device 4 is formed by a computer, for example, and has a processor processing information, a memory communicatively coupled to the processor, and an external interface coupling to an external device. A teaching support program PP executable by the processor is saved in the memory. The processor can read and execute the teaching support program PP. The teaching support program PP is software supporting the teaching to the robot 2. The teaching support device 4 is hardware where this software is installed.

As shown in FIG. 2, the teaching support device 4 has an input accepting unit 41 accepting an input from a user, and a computing unit 42 optimizing the attitude of the robot arm 22 and the position of the end effector 23, based on information accepted by the input accepting unit 41. Also, a monitor 51 as a display device, and an input device 52 such as a keyboard or a mouse, are coupled to the teaching support device 4.

In the description below, for the sake of convenience of the description, a movement D that the user teaches the robot 2 is a task of polishing a side surface of the target object Q with the abrasive wheel 231 while making a lap around the target object Q, as shown in FIG. 3. In the movement D, a movement start point and a movement end point are both P0 and a plurality of teaching points P1, P2, P3, P4, P5 are set between the movement start point and the movement end point. The robot arm 22 moves in such a way that the abrasive wheel 231 passes over the movement start point P0, the teaching point P1, the teaching point P2, the teaching point P3, the teaching point P4, the teaching point P5, and the movement end point P0 in this order. In the description below, the movement start point is denoted by P0 and the movement end point is denoted by P0' in order to distinguish the movement start point and the movement end point from each other.

In a movement in which the robot arm 22 is moved in a trajectory that draws a circle, as in the movement D, the amounts of rotation (angles of rotation) of the joints J1 to J6 tend to be large and the range of options for the attitude of the robot arm 22 that can complete the movement D tends to be narrow. Therefore, it is difficult to teach the robot 2 and teaching support by the teaching support device 4 is more effective. However, the movement D is not particularly limited. For example, the movement start point and the movement end point may differ from each other.

The teaching support device 4 optimizes the attitude of the robot arm 22 in the movement from the movement start point P0 to the teaching point P1, in the movement from the teaching point P1 to the teaching point P2, in the movement from the teaching point P2 to the teaching point P3, in the movement from the teaching point P3 to the teaching point P4, in the movement from the teaching point P4 to the teaching point P5, and in the movement from the teaching point P5 to the movement end point P0', using an LJM function.

The LJM function is a function that decides the attitude of the robot arm 22 by combining a plurality of parameters P in such a way as to minimize the total amount of rotation of the joints J1 to J6 in relation to a designated position (target position) as viewed from a reference position (current position). The parameters P are not particularly limited. In this embodiment, five parameters that are highly related to the attitude of the robot arm 22, specifically, "joint J1 Flag", "elbow", "wrist", "joint J4 Flag", and "joint J6 Flag", are employed, as shown in FIG. 4.

As the "joint J1 Flag", 0 indicating that the angle of rotation of the joint J1 of the arm 221 from the reference position is 0° to −180° or 0° to +180°, or 1 indicating that the angle of rotation of the joint J1 of the arm 221 from the reference position is −180° to −240° or +180° to +240°, is selected. As the "elbow", A indicating that the joint J3 is directed forward (to one side), or B indicating that the joint J3 is directed backward (to the other side), is selected. As the "wrist", NF (No Flip) indicating that a predetermined surface of the arm 224 faces upward, or F (Flip) indicating that the arm 224 is reversed to make the predetermined surface face downward, is selected. As the "joint J4 Flag", 0 indicating that the angle of rotation of the joint J4 of the arm 224 from the reference position is greater than −180° and equal to or smaller than +180°, or 1 indicating that the angle of rotation of the joint J4 of the arm 224 from the reference position is equal to or smaller than −180° or greater than +180°, is selected. Similarly, as the "joint J6 Flag", 0 indicating that the angle of rotation of the joint J6 of the arm 226 from the reference position is greater than −180° and equal to or smaller than +180°, or 1 indicating that the angle of rotation of the joint J6 of the arm 226 from the reference position is greater than −360° and equal to or smaller than −180° or greater than +180°, is selected.

When the teaching point P1 is designated as the designated position and the movement start point P0 is designated as the reference position as in LJM(P0, P1), the teaching support device 4 decides the individual parameters P, for example, joint J1 Flag=0, elbow=A, wrist=NF, joint J4 Flag=0, and joint J6 Flag=1, in such a way as to minimize the total amount of rotation of the joints J1 to J6 when the end effector 23 moves from the movement start point P0 to the teaching point P1, using the LJM function. The teaching support device 4 similarly decides the individual parameters P with respect to LJM(P1, P2), LJM(P2, P3), LJM(P3, P4), LJM(P4, P5), and LJM(P5, P0').

Thus, the attitude of the robot arm 22 during the movement to the teaching point P1 is optimized, based on the attitude of the robot arm 22 at the movement start point P0. The attitude of the robot arm 22 during the movement to the teaching point P2 is optimized, based on the attitude of the robot arm 22 at the teaching point P1. The attitude of the robot arm 22 during the movement to the teaching point P3 is optimized, based on the attitude of the robot arm 22 at the teaching point P2. The attitude of the robot arm 22 during the movement to the teaching point P4 is optimized, based on the attitude of the robot arm 22 at the teaching point P3. The attitude of the robot arm 22 during the movement to the teaching point P5 is optimized, based on the attitude of the robot arm 22 at the teaching point P4. The attitude of the robot arm 22 during the movement to the movement end point P0' is optimized, based on the attitude of the robot arm 22 at the teaching point P5. Therefore, the motion of the robot arm 22 during the movement D becomes smoother. The accuracy of the movement D is improved and the time taken for the movement D is reduced.

According to such a method, the attitudes of the robot arm 22 at the teaching points P1, P2, P3, P4, P5 and the movement end point P0' are sequentially optimized, based on the attitude of the robot arm 22 at the movement start point P0. Therefore, the movement D can be smoothly executed. However, if the robot arm 22 is set in an inappropriate attitude at the movement start point P0, the subsequent attitude of the robot arm 22 is optimized, based on the inappropriate attitude. Therefore, there is a risk of, for example, a drop in the task efficiency such as a longer task time, and a contact interference or the like between the robot arm 22 and the robot 2 itself due to an inappropriate movement where the contact state between the target object Q and the abrasive wheel 231 cannot be maintained. In order to optimize the attitude of the robot arm 22 using the LJM function, it is important that the robot arm 22 is set in an appropriate attitude at the movement start point P0.

To this end, the teaching support device 4 executes a teaching support task S1 as described below, so that the user can set the robot arm 22 in an appropriate attitude at the movement start point P0.

As shown in FIG. 5, the teaching support task S1 includes an information acquisition step S11 of acquiring the movement D of the robot arm 22 and the movement start point P0 where the movement D starts, a candidate calculation step S12 of calculating a plurality of candidates for the attitude of the robot arm 22 at the acquired movement start point P0, a rotation state calculation step S13 of calculating the states of rotation of the joints J1 to J6 as of when the robot arm 22 is moved according to the movement D from the movement start point P0, for each of the plurality of candidates that are calculated, and a reporting step S14 of reporting the result of the calculation to the user.

Information Acquisition Step S11

The teaching support device 4 accepts information about the movement D of the robot arm 22 and the movement start point P0 where the movement D starts, from the user via the input device 52.

Candidate Calculation Step S12

The teaching support device 4 calculates a plurality of candidates for the attitude of the robot arm 22 at the movement start point P0, based on the movement start point P0 acquired in the information acquisition step S11. In this embodiment, the teaching support device 4 decides the attitude of the robot arm 22 at the movement start point P0, using a total of four parameters, that is, joint J1 Flag, wrist, joint J4 Flag, and joint J6 Flag, and therefore calculates all the combinations of these four parameters, that is, $2^4=16$ patterns of candidates. However, the numbers of parameters P and candidates are not particularly limited.

Rotation State Calculation Step S13

The teaching support device 4 calculates a change with time in the states of rotation of the joints J1 to J6, specifically, the amounts of rotation (angles of rotation) of the joints J1 to J6, as of when the robot arm 22 is moved according to the movement D from the movement start point P0, for each of the plurality of candidates that are calculated.

Reporting Step S14

The teaching support device 4 displays the result of the calculation in the rotation state calculation step S13 on the screen of the monitor 51 and thus reports the result of the calculation to the user. In this embodiment, the result of the calculation is displayed as a list F1 shown in FIG. 6 on the screen of the monitor 51. The list F1 shows all the 16 patterns of candidates. Each parameter P and "Result" are linked to each candidate. Thus, the result of the calculation can be reported to the user more intelligibly.

A candidate whose linked "Result" is "x" means that the movement D cannot be executed since the amount of rotation of one of the joints J1 to J6 exceeds the range of motion during the movement D. A candidate whose linked "Result" is "Show" means that the movement D can be executed since the amounts of rotation of the joints J1 to J6 do not exceed the range of motion during the movement D. Therefore, by checking the list F1, the user can easily check which attitude (combination of parameters P) enables the execution of the movement D and can easily teach the robot 2 after the check. In this way, the teaching support device 4 reports the list F1 to the user and thus supports the user in teaching the robot.

When the user selects "Show", the teaching support device 4 displays a graph F2 showing a change with time in the amounts of rotation of the joints J1 to J6 corresponding to the selected candidate, on the screen of the monitor 51, as shown in FIGS. 7 and 8. Thus, the result of the calculation can be reported to the user more intelligibly. For example, FIG. 7 is a graph showing a change with time in the amounts of rotation of the joints J1 to J6 corresponding to a candidate 0. FIG. 8 is a graph showing a change with time in the amounts of rotation of the joints J1 to J6 corresponding to a candidate 1.

In the case of the candidate 0 shown in FIG. 7, the rotations of the joints J1 to J6 are continuous during the movement D. This means that the movement D can be executed more smoothly if the attitude of the robot arm 22 at the movement start point P0 is set according to the parameters P of the candidate 0.

Meanwhile, in the case of the candidate 1 shown in FIG. 8, the rotations of the joints J1 to J3, J5, and J6 are continuous during the movement D, whereas the rotation of the joint J4 is discontinuous. The term "discontinuous" means that a joint rotates by 180° or more when the robot arm moves from one point to the next point during the movement D. The term "continuous" means otherwise. Therefore, when the attitude of the candidate 1 is employed as the attitude of the robot arm 22 at the movement start point P0, the movement D can be executed but needs to be temporarily stopped in the middle and then needs to be resumed after the joint J1 is rotated by 180° or more to bring the robot arm 22 into a new attitude. Consequently, the movement D takes a longer time and results in lower task efficiency. Also, as the movement D is temporarily stopped, there is a risk of task failure at the stop site.

Therefore, preferably, the user checks the graph F2 corresponding to each candidate, selects one from among candidates where the rotations of all the joints J1 to J6 are continuous, and teaches the robot 2, based on the selected candidate. Thus, the robot 2 can be made to execute the movement D more smoothly. In this way, reporting not only whether the movement D can be executed or not but also whether the rotations of the joints J1 to J6 during the movement D are continuous or not, to the user, makes the robot teaching support for the user by the teaching support device 4 more effective. Therefore, the user can teach the robot 2 more easily.

Particularly, in this embodiment, the discontinuous rotation of the joint J4 is highlighted to be more visible than the continuous rotations of the other joints J1 to J3, J5, and J6, as shown in FIG. 8. Therefore, the user can easily determine whether the selected candidate includes a joint with discontinuous rotation or not. The method for highlighting is not particularly limited. For example, a method such as using a bold line or changing the color of the line may be employed.

In this way, the information acquisition step S11, which is a step of acquiring the movement D of the robot arm 22 having at least one of joints J1 to J6 and the movement start point P0 where the movement D starts, the candidate calculation step S12, which is a step of calculating a plurality of candidates for the attitude of the robot arm 22 at the acquired movement start point P0, the rotation state calculation step S13, which is a step of calculating the state of rotation of the joints J1 to J6 as of when the robot arm 22 is moved according to the movement D from the movement start point P0, for each of the plurality of candidates that are calculated, and the reporting step S14, which is a step of reporting the result of the calculation, are executed. According to such a method, the attitude of the robot arm 22 at the movement start point P0 can be optimized and the result thereof can be reported to the user. Therefore, the user can teach the movement D easily and securely, based on the reported result.

As described above, the robot arm 22 has the plurality of joints J1 to J6. In the rotation state calculation step S13, the state of rotation of each of the joints J1 to J6 is calculated. Thus, the state of the robot arm 22 during the movement D can be calculated in detail.

As described above, the movement end point P0' where the movement D ends is the same as the movement start point P0. In this way, in the movement D, where the robot arm 22 is moved in a trajectory that draws a circle, the amounts of rotation (angles of rotation) of the joints J1 to J6 tend to be large and the range of options for the attitude of the robot arm 22 that can complete the movement D tends to be narrow. Therefore, it is difficult to teach the robot 2 and teaching support based on the teaching support method is more effective.

As described above, the teaching support device 4 acquires the movement D of the robot arm 22 having at least one of joints J1 to J6 and the movement start point P0 where the movement D starts. The teaching support device 4 calculates a plurality of candidates for the attitude of the robot arm 22 at the acquired movement start point P0. The teaching support device 4 calculates the state of rotation of the joints J1 to J6 as of when the robot arm 22 is moved according to the movement D from the movement start point P0, for each of the plurality of candidates that are calculated. The teaching support device 4 reports the result of the calculation. According to such a configuration, the attitude of the robot arm 22 at the movement start point P0 can be optimized and the result thereof can be reported to the user. Therefore, the user can teach the movement D easily and securely, based on the reported result.

As described above, the teaching support program includes: acquiring the movement D of the robot arm 22 having at least one of joints J1 to J6 and the movement start point P0 where the movement D starts; calculating a plurality of candidates for the attitude of the robot arm 22 at the acquired movement start point P0; calculating the state of rotation of the joints J1 to J6 as of when the robot arm 22 is moved according to the movement D from the movement start point P0, for each of the plurality of candidates that are calculated; and reporting the result of the calculation. According to such a configuration, the attitude of the robot arm 22 at the movement start point P0 can be optimized and the result thereof can be reported to the user. Therefore, the user can teach the movement D easily and securely, based on the reported result.

As described above, the attitude of the robot arm 22 in a movement from a predetermined teaching point to the next teaching point included in the trajectory of the movement D is set in such a way as to minimize the amount of rotation of the joints J1 to J6. Thus, the motion of the robot arm 22 during the movement D becomes smoother. The accuracy of the movement D is improved and the time taken for the movement D is reduced.

As described above, in the reporting, the list F1 is displayed, which is a table showing whether the movement D can be executed or not, for each candidate. Thus, the result can be reported to the user more intelligibly.

As described above, in the reporting, the graph F2 showing a change with time in the amounts of rotation of the joints J1 to J6 is displayed. Thus, the result can be reported to the user more intelligibly.

The teaching support method, the teaching support device, and the teaching support program according to the present disclosure have been described, based on the illustrated embodiment. However, the present disclosure is not limited to this embodiment. The configuration of each part can be replaced with any configuration having a similar function. Any other component may be added to the present disclosure. Various embodiments may be combined together where appropriate.

In the above embodiment, the teaching support task S1 includes the information acquisition step S11, the candidate calculation step S12, the rotation state calculation step S13, and the reporting step S14. However, the teaching support task S1 is not limited to this and may include another step.

As another step, though not particularly limited, for example, a workpiece attitude change recommendation step of recommending to the user a change in the attitude (direction) of the target object Q in relation to the robot may be employed. The workpiece attitude change recommendation step may be executed when the result of calculation acquired by the rotation state calculation step S13, that is, the "Result" linked to each candidate, is "x" for all the candidates. By executing such a workpiece attitude change recommendation step, the user can change the attitude of the target object Q and execute the teaching support task S1 again, and thus can acquire a more appropriate result of calculation. The workpiece attitude change recommendation step may be configured to be executed not only when the "Result" linked to each candidate is "x" for all the candidates but also when the "Result" in the result of calculation is "x" for a predetermined number of candidates.

Also, as another step, for example, an end effector attachment direction change recommendation step of suggesting to the user a change in the direction of attachment of the end effector 23 to the arm 226 may be employed. The end effector attachment direction change recommendation step may be executed when the result of calculation acquired by the rotation state calculation step S13, that is, the "Result" linked to each candidate, is "x" for all the candidates. By executing such an end effector attachment direction change recommendation step, the user can change the direction of attachment of the end effector 23 and execute the teaching support task S1 again, and thus can acquire a more appropriate result of calculation. The end effector attachment direction change recommendation step may be configured to be executed not only when the "Result" linked to each candidate is "x" for all the candidates but also when the "Result" in the result of calculation is "x" for a predetermined number of candidates.

Also, as another step, for example, an end effector contact position change recommendation step of recommending to the user a change in the position on the end effector 23 to come into contact with the target object Q may be employed. The end effector contact position change recommendation step may be executed when the result of calculation acquired by the rotation state calculation step S13, that is, the "Result" linked to each candidate, is "x" for all the candidates. By executing such an end effector contact position change recommendation step, the user can change the position on the end effector 23 to come into contact with the target object Q and execute the teaching support task S1 again, and thus can acquire a more appropriate result of calculation. The end effector contact position change recommendation step may be configured to be executed not only when the "Result" linked to each candidate is "x" for all the candidates but also when the "Result" in the result of calculation is "x" for a predetermined number of candidates.

What is claimed is:

1. A teaching support method for causing a processor to execute a program stored in a memory, the teaching method comprising executing on the processor the steps of:

acquiring a movement of a robot arm having a plurality of joints, a movement start point where the movement starts, and a plurality of teaching points along which the robot arm moves;

calculating a plurality of attitude candidates for an attitude of the robot arm at the movement start point;

calculating a rotation amount of each of the plurality of joints when the robot arm moves between every two adjacent points among the movement start point and the plurality of teaching points for each of the plurality of attitude candidates;

calculating a plurality of sums of the rotation amounts of the plurality of joints at the plurality of teaching points for each of the plurality of attitude candidates;

selecting a plurality of lowest values of the plurality of sums at the plurality of teaching points among the plurality of attitude candidates;

identifying a plurality of attitudes of the robot arm at the plurality of teaching points corresponding to the plurality of lowest values;

reporting the plurality of attitudes of the robot arm; and operating the robot arm according to the identified plurality of attitudes.

2. The teaching support method according to claim 1, wherein a movement end point where the movement ends is the same as the movement start point.

3. A teaching support device comprising:

a memory configured to store a program; and a processor configured to execute the program so as to:

acquire a movement of a robot arm having a plurality of joints, a movement start point where the movement starts, and a plurality of teaching points along which the robot arm moves;

calculate a plurality of attitude candidates for an attitude of the robot arm at the movement start point;

calculate a rotation amount of each of the plurality of joints when the robot arm moves between every two adjacent points among the movement start point and the plurality of teaching points for each of the plurality of attitude candidates;

calculate a plurality of sums of the rotation amounts of the plurality of joints at the plurality of teaching points for each of the plurality of attitude candidates;

select a plurality of lowest values of the plurality of sums at the plurality of teaching points among the plurality of attitude candidates;

identify a plurality of attitudes of the robot arm at the plurality of teaching points corresponding to the plurality of lowest values;

report the plurality of attitudes of the robot arm; and operating the robot arm according to the identified plurality of attitudes.

4. A non-transitory computer-readable storage medium storing a teaching support program for causing a computer to execute a process by a processor so as to perform the steps of:

acquiring a movement of a robot arm having a plurality of joints, a movement start point where the movement starts, and a plurality of teaching points along which the robot arm moves;

calculating a plurality of attitude candidates for an attitude of the robot arm at the movement start point;

calculating a rotation amount of each of the plurality of joints when the robot arm moves between every two adjacent points among the movement start point and the plurality of teaching points for each of the plurality of attitude candidates;

calculating a plurality of sums of the rotation amounts of the plurality of joints at the plurality of teaching points for each of the plurality of attitude candidates;

selecting a plurality of lowest values of the plurality of sums at the plurality of teaching points among the plurality of attitude candidates;

identifying a plurality of attitudes of the robot arm at the plurality of teaching points corresponding to the plurality of lowest values;

reporting the plurality of attitudes of the robot arm; and operating the robot arm according to the identified plurality of attitudes.

5. The non-transitory computer-readable storage medium storing the teaching support program according to claim 4, further comprising:

displaying a table showing whether the movement can be executed or not for each of the plurality of attitude candidates.

6. The non-transitory computer-readable storage medium storing the teaching support program according to claim 4, further comprising:

displaying a graph showing a change with time in the rotation amount of each of the plurality of joints with respect to each of the plurality of attitude candidates.

* * * * *